US007656456B2

United States Patent
Zhang

(10) Patent No.: US 7,656,456 B2
(45) Date of Patent: Feb. 2, 2010

(54) IMAGE SENSING SYSTEM AND METHOD OF CONTROLLING SAME

(75) Inventor: Yitong Zhang, Asaka (JP)

(73) Assignee: Fujifilm Corporation, Tokyo (JP)

( * ) Notice: Subject to any disclaimer, the term of this patent is extended or adjusted under 35 U.S.C. 154(b) by 499 days.

(21) Appl. No.: 11/515,955

(22) Filed: Sep. 6, 2006

(65) Prior Publication Data

US 2007/0052838 A1 Mar. 8, 2007

(30) Foreign Application Priority Data

Sep. 7, 2005 (JP) ............................ 2005-258670

(51) Int. Cl.
*H04N 5/235* (2006.01)
(52) U.S. Cl. ................... 348/362; 348/221.1; 348/364
(58) Field of Classification Search ................ None
See application file for complete search history.

(56) References Cited

U.S. PATENT DOCUMENTS

2006/0204057 A1* 9/2006 Steinberg ................... 382/118

FOREIGN PATENT DOCUMENTS

JP 2001-330882 A 11/2001
JP 2003-92700 A 3/2003

* cited by examiner

*Primary Examiner*—Nhan T Tran
*Assistant Examiner*—Angel L Garces-Rivera
(74) *Attorney, Agent, or Firm*—Birch, Stewart, Kolasch & Birch, LLP

(57) ABSTRACT

Both a specific target and the background thereof in the image of a subject are caused to take on brightnesses that are relatively appropriate. Preliminary image sensing is performed to obtain a preliminary image of the subject. The image of a face is detected from within the preliminary image of the subject and the representative luminance of the face image is calculated. If the representative luminance calculated is not appropriate, then amount of exposure is adjusted so as to make the face image slightly darker than the appropriate brightness. Regular image sensing is then carried out. If the representative luminance of the face image in the image of the subject obtained by regular image sensing is not appropriate, a tone adjustment is applied utilizing a tone curve. Thus there is obtained an image of the subject in which both the face image and its background exhibit brightnesses that are relatively appropriate.

3 Claims, 15 Drawing Sheets

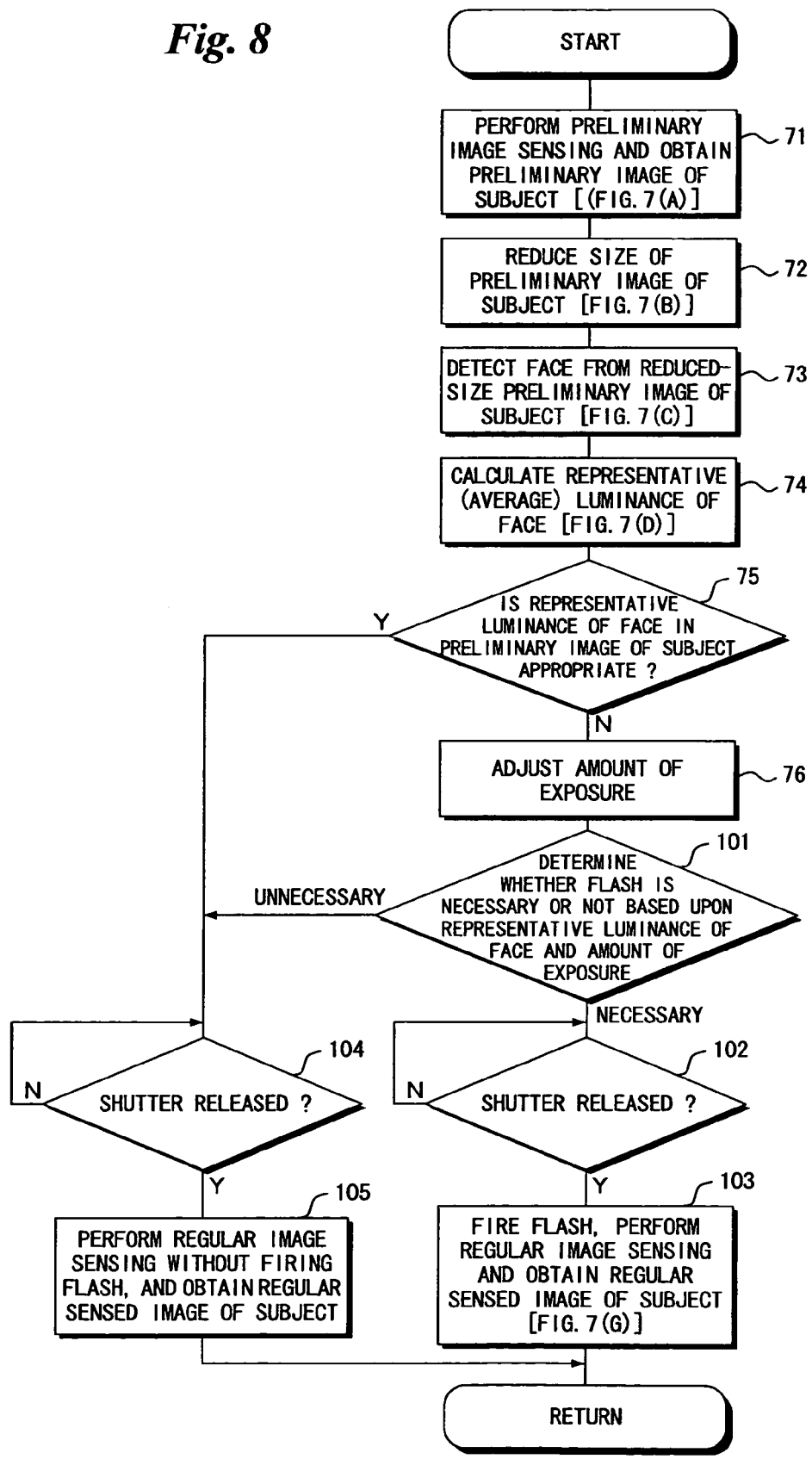

96

115

111

113 112

113 114

131

137

144

132

139

145

134  133

141  140

147  146

136  135

143  142

149  148

150

IMAGE SENSING SYSTEM AND METHOD OF CONTROLLING SAME

BACKGROUND OF THE INVENTION

1. Field of the Invention

This invention relates to an image sensing system and to a method of controlling the system.

2. Description of the Related Art

The image of a subject obtained by image sensing is influenced by the light source and surrounding colors and for this reason may exhibit a color imbalance and inadequate tone for the main subject. In order to deal with this, there are instances where the image of the subject is analyzed and subjected to a white balance adjustment and tone correction. Nevertheless, it is not always easy to improve the image quality of the overall image of the subject. There are also examples of the prior art that detect the main subject image such as the image of a face in the image of the subject, calculate the luminance and condition of the color of the main subject image and apply an f-stop adjustment and tone correction if brightness and color are inappropriate (see the specifications of Japanese Patent Application Laid-Open Nos. 2003-92700, 2001-330882).

However, if f-stop or the like is adjusted in such a manner that the main subject image will have the appropriate brightness, the image of the bright portion will develop so-called blow-out in a cases where the background of the main subject is bright. Further, in a cases where the background of the main subject is dark, noise will be emphasized if the image of the dark portion is subjected to a tone correction.

SUMMARY OF THE INVENTION

Accordingly, an object of the present invention is to prevent problems in specific portions of an image such as in the background of a main subject.

According to the present invention, the foregoing object is attained by providing an image sensing system comprising: an image sensing device for sensing the image of a subject and outputting image data representing the image of the subject; a preliminary-image-sensing control device (means) for controlling the image sensing device so as to perform preliminary image sensing and output image data representing a preliminary image of the subject; a first target-image detecting device (means) for detecting a target image from within the preliminary image of the subject represented by the image data that has been output from the image sensing device under the control of the preliminary-image-sensing control device; an exposure-amount adjustment determination device (means) for determining whether adjustment of amount of exposure is necessary based upon the target image that has been detected by the first target-image detecting device; a first regular-image-sensing control device (means) for controlling the image sensing device so as to perform regular image sensing and output image data, which represents a regular sensed image of the subject, in response to a determination by the exposure-amount adjustment determination device that adjustment of amount of exposure is unnecessary; an exposure-amount adjusting device (means) for adjusting amount of exposure, in response to a determination by the exposure-amount adjustment determination device that adjustment of amount of exposure is necessary, in such a manner that the amount of exposure of the target image detected by the first target-image detecting device will result in a brightness in the vicinity of an appropriate brightness; and a second regular-image-sensing control device for controlling the image sensing device so as to perform regular image sensing and output image data, which represents a regular sensed image of the subject, based upon the amount of exposure obtained by the adjustment by the exposure-amount adjusting device.

The present invention also provides a control method suited to the above-described image sensing system. More specifically, the present invention provides a method of controlling an image sensing system having an image sensing device for sensing the image of a subject and outputting image data representing the image of the subject, comprising the steps of: controlling the image sensing device so as to perform preliminary image sensing and output image data representing a preliminary image of the subject; detecting a target image from within the preliminary image of the subject represented by the image data that has been output from the image sensing device by preliminary image sensing; determining whether adjustment of amount of exposure is necessary based upon the target image that has been detected; controlling the image sensing device so as to perform regular image sensing and output image data, which represents a regular sensed image of the subject, in response to a determination that adjustment of amount of exposure is unnecessary; adjusting amount of exposure, in response to a determination that adjustment of amount of exposure is necessary, in such a manner that the amount of exposure of the target image detected will result in a brightness in the vicinity of an appropriate brightness; and controlling the image sensing device so as to perform regular image sensing and output image data, which represents a regular sensed image of the subject, based upon the amount of exposure obtained by adjustment.

In accordance with the present invention, image data representing a preliminary image of a subject is obtained by preliminary image sensing, and a target image is detected from within the preliminary image of the subject. Whether adjustment of the amount of exposure is necessary or not is determined based upon the target image detected.

If adjustment of amount of exposure is unnecessary, regular image sensing is performed and a regular sensed image of the subject is obtained. If adjustment of amount of exposure is necessary, then the amount of exposure is adjusted in such a manner that the amount of exposure of the detected target image will result in a brightness in the vicinity of an appropriate brightness (not the appropriate brightness per se). Regular image sensing is performed based upon the amount of exposure obtained by the adjustment, and image data representing the regular sensed image of the subject is obtained.

In accordance with the present invention, the amount of exposure of the detected target image is not the appropriate brightness per se; the amount of exposure is adjusted in such a manner that the amount of exposure of the detected target image result in a brightness in the vicinity of an appropriate brightness. In a case where the target image is dark and the background too bright, there is a possibility that the background will experience blow-out if the amount of exposure is adjusted in such a manner that the amount of exposure of the target image results in the appropriate brightness. In accordance with the present invention, the amount of exposure of the target image is adjusted to an amount of exposure that is in the vicinity of the appropriate brightness, i.e., in this case, to such an extent that the appropriate brightness is not attained. This makes it possible to diminish the likelihood that blow-out will occur in the background, while the target image is brightened.

The apparatus may further comprise: a tone-correction determination device (means) for determining whether to perform a tone correction based upon an image in an area corresponding to the target image detected by the first target-image detecting device in the regular sensed image of the subject represented by the image data that has been output from the image sensing device under the control of the second regular-image-sensing control device; and a tone correcting device (means), responsive to a determination by the tone-correction determination device that a tone correction is to be performed, for subjecting the image data, which has been output from the image sensing device under the control of the second regular-image-sensing control device, to a tone correction by an amount of tone correction smaller than a tone correction that brings the target image detected by the first target-image detecting device to an appropriate brightness in a case where adjustment of amount of exposure by the exposure-amount adjusting device is not carried out.

The tone correction is applied to the regular sensed image of the subject that has been obtained by improving the amount of exposure in such a manner that the brightness of the target image becomes that in the vicinity of the appropriate brightness. This means that only a small degree of tone correction will suffice and makes it possible to prevent noise from being emphasized even if the regular sensed image of the subject has dark portions.

The tone correcting device performs at least one of a linear tone correction and non-linear tone correction, by way of example.

The apparatus may further comprise a flash light-emission determination device (means) for determining whether a flash light-emission is necessary based upon an image in an area corresponding to the target image detected by the first target-image detecting device and the amount of exposure obtained by the adjustment performed by the exposure-amount adjusting device in the preliminary sensed image of the subject represented by the image data that is output from the image sensing device under the control of the preliminary-image-sensing control device; and a flash light-emission control device (means), responsive to a determination by the flash light-emission determination device that a flash light-emission is necessary, for controlling a flash light-emission unit in such a manner that a flash light-emission is performed in sync with regular image sensing by the second regular-image-sensing control device (means).

The apparatus may further comprise: a second target-image detecting device (means) for detecting the target image from within the regular sensed image of the subject represented by the image data that is output from the image sensing device based upon control by the second regular-image-sensing control device; a tone-correction determination device (means) for determining whether a tone correction is necessary based upon the target image that has been detected by the second target-image detecting device; and a tone correcting device (means), responsive to a determination by the tone-correction determination device that a tone correction is necessary, for subjecting the image data, which is output from the image sensing device under the control of the second regular-image-sensing control device, to a tone correction in such a manner that the target image detected by the second target-image detecting device will become the appropriate brightness.

The target image is detected from within the regular sensed image of the subject. Therefore, by recording on a recording medium the image data representing the regular sensed image of the subject, the tone of the image data representing the target image actually recorded is improved.

The apparatus may further comprise: a second target-image detecting device (means) for detecting the target image from within the regular sensed image of the subject represented by the image data that is output from the image sensing device under the control of the second regular-image-sensing control device; a tone-correction determination device (means) for determining whether a tone correction of the target image detected by the second target-image detecting device is necessary; and a tone correcting device (means), responsive to a determination by the tone-correction determination device that a tone correction is necessary, for subjecting the image data, which is output from the image sensing device under the control of the second regular-image-sensing control device, to a tone correction smaller than a tone correction that brings the target image detected by the first target-image detecting device to an appropriate brightness in a case where adjustment of amount of exposure by the exposure-amount adjusting device is not carried out.

The apparatus may further comprise a reduced-image generating device (image) for generating a reduced image of the regular sensed image of the subject represented by the image data that is output from the image sensing device based upon control by the second regular-image-sensing control device. In this case, the second target-image detecting device would detect the target image from within the reduced image generated by the reduced-image generating device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a flowchart illustrating processing executed by the digital still camera according to another embodiment of the present invention;

DESCRIPTION OF THE PREFERRED EMBODIMENTS

Preferred embodiments of the present invention will now be described in detail with reference to the drawings.

Figure 1:
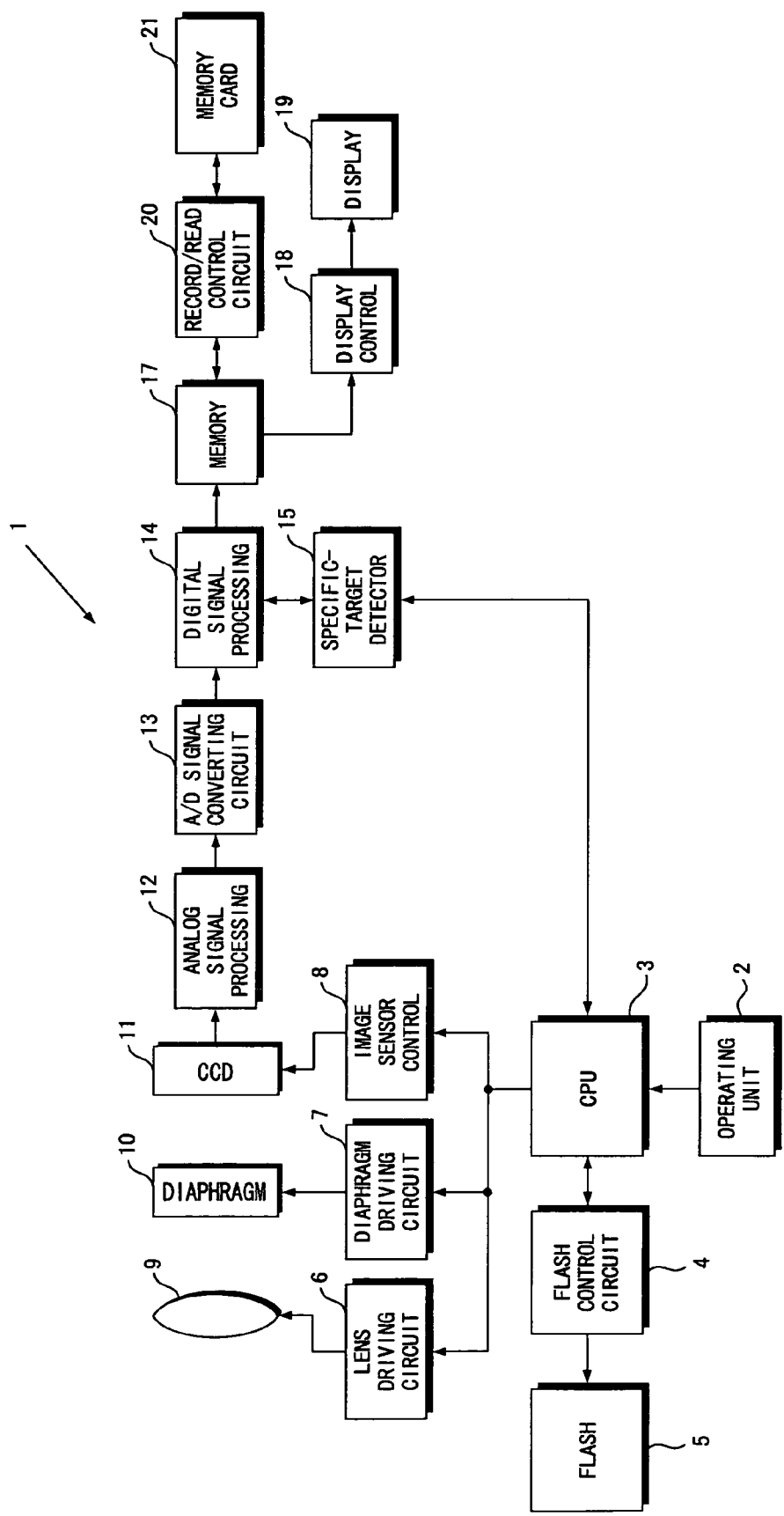
FIG. 1 is a block diagram illustrating the electrical structure of a digital still camera.

FIG. 1, which illustrates a first embodiment of the invention, is a block diagram illustrating the electrical structure of a digital still camera 1.

The overall operation of the digital still camera 1 is controlled by a CPU 3.

The digital still camera 1 is provided with an operating unit 2 that includes a variety of buttons such as a power button, a shutter-release button and a mode setting switch. An operation signal from the operating unit 2 is input to a CPU 3. The digital still camera 1, which is capable of flash photography, is also provided with a flash unit 5 and a flash control circuit 4 for controlling a flash light-emission in the flash unit 5.

Preliminary image sensing is performed if an image sensing mode is set by the mode setting switch.

The digital still camera 1 is provided with an imaging lens 9 positioned by a lens driving circuit 6. A light image representing a preliminary image of the subject obtained by preliminary image sensing is formed on the photoreceptor surface of a CCD 11 through a diaphragm 10 controlled by a diaphragm control circuit 7. Under the control of an image-sensor control circuit 8, the CCD 11 outputs an analog video signal representing the preliminary image of the subject. The video signal is subjected to prescribed analog signal processing in an analog signal processing circuit 12 and the processed signal is input to an analog/digital converting circuit 13. The analog/digital converting circuit 13 converts the analog video signal to digital image data and inputs the data to a digital signal processing circuit 14.

Image data that has been output from the digital signal processing circuit 14 is input to a display control circuit 18 through a memory 17. By controlling a display unit 19 using the display control circuit 18, the preliminary image of the subject is displayed on the display screen of the display unit 19.

The digital image data is output from the digital signal processing circuit 14 and is input also to a specific-target detecting circuit 15. The latter detects a face image portion from the preliminary image of the subject obtained by preliminary image sensing. It goes without saying that a portion of the image other than a face may be detected as a specific target. Image data representing the face image portion detected by the specific-target detecting circuit 15 is input to the CPU 3. The latter decides the f-stop value of the diaphragm 10 and the shutter speed of the CCD 11 in such a manner that the face image portion becomes slightly darker than the appropriate brightness.

Figure 2:
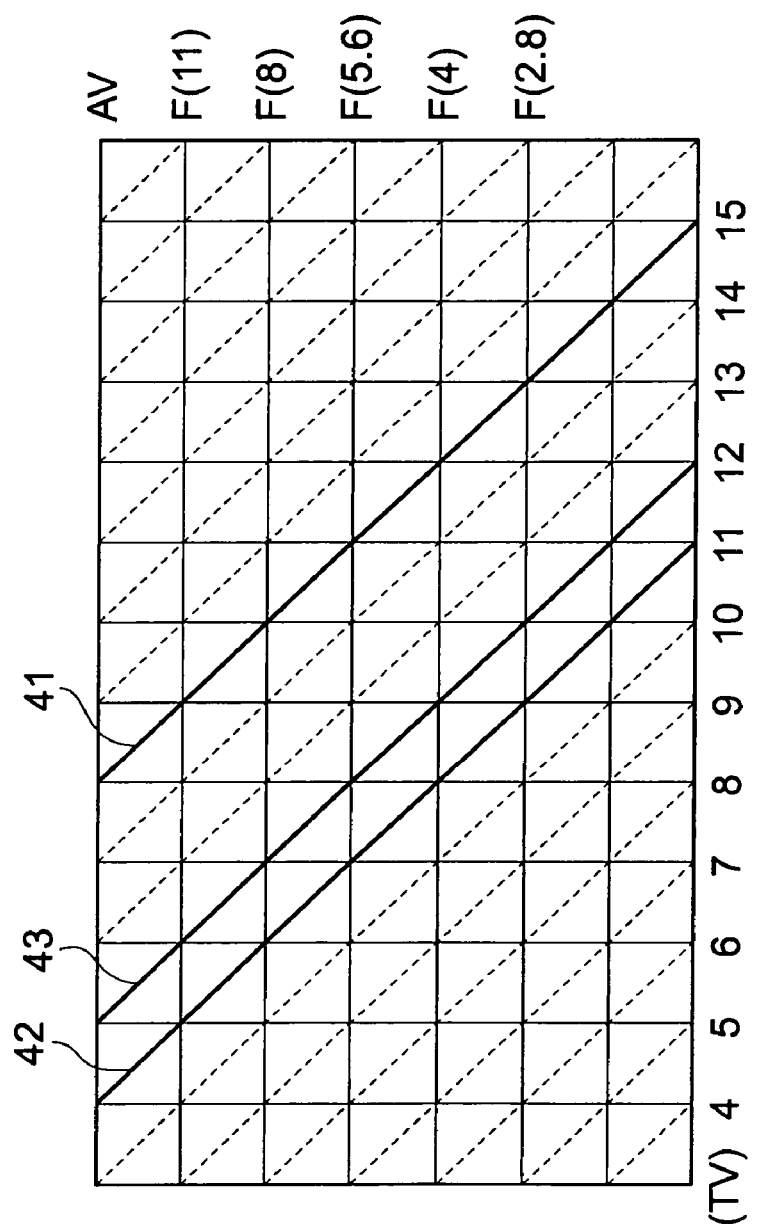
FIG. 2 illustrates examples of program diagrams.

FIG. 2 illustrates examples of program diagrams.

A program diagram 41 is one used when the overall preliminary image of the subject is made to have the appropriate brightness. If the program diagram 41 is used, the overall preliminary image of the subject will have the prescribed brightness but a specific target such as a face in the preliminary image of the subject may be dark. A program diagram 42 is one used when a specific target such as a face in the preliminary image of the subject is made to have the appropriate brightness. If the program diagram 42 is used, a specific target such as a face can take on a prescribed brightness but so-called blow-out may occur in the background in cases such as one where the background is bright. A program diagram 43 is one used when a specific target such as a face in the preliminary image of the subject becomes slightly darker than the appropriate brightness. If this program diagram is used, however, blow-out will not occur in the background even in a case where the background is bright.

In this embodiment, the amount of exposure is controlled using the program diagram 43 and the f-stop value of the diaphragm 10 and shutter speed of the CCD 11 are decided in the manner described above.

With reference again to FIG. 1, regular image sensing is performed if the shutter-release button is pressed. The regular sensed image of the subject obtained by regular image sensing is formed on the photoreceptor surface of the CCD 11. As mentioned above, the image data representing the regular sensed image of the subject is input to the digital signal processing circuit 14. The latter subjects the entered digital image data to a tone correction, etc. Since the tone correction is applied to image data that has been obtained by performing exposure control in such a manner that the face image portion becomes slightly darker than the appropriate brightness, the tone correction applied is weaker than a tone correction that would be applied if exposure control had not been carried out. The processing executed by the digital signal processing circuit 14 will be described later in greater detail.

The image data that has been subjected to tone correction, etc., in the digital signal processing circuit 14 is applied to the memory 17 and stored there temporarily. When the image data is read out of the memory 17, it is recorded on a memory card 21 by a record/read control circuit 20.

The digital still camera 1 in this embodiment has a playback function as well. If the playback mode is set by the mode setting switch, the image data is read out of the memory card 21 by the record/read control circuit 20. The image data read is applied to the display control circuit 18 via the memory 17, whereby an image is displayed on the display screen of the display unit 19.

Figure 3:
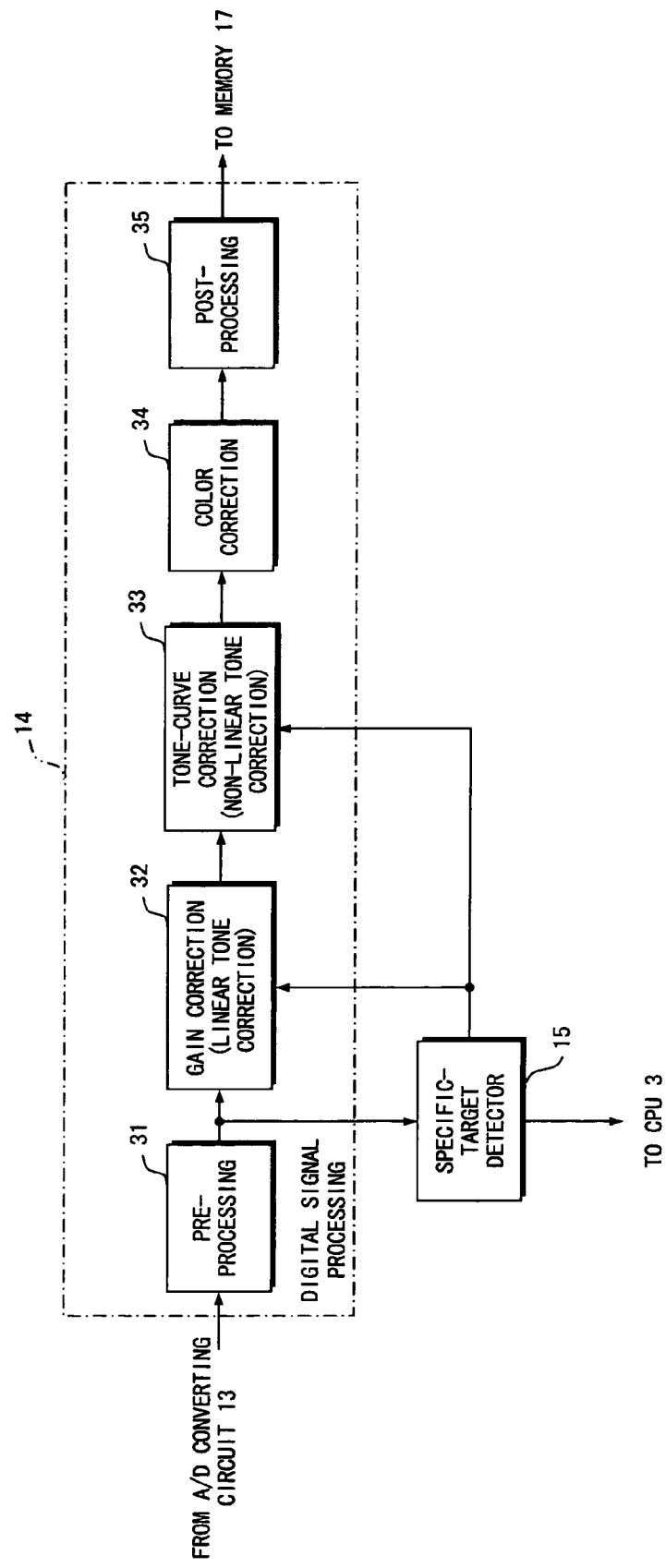
FIG. 3 is a block diagram illustrating the electrical structure of a digital signal processing circuit.

FIG. 3 is a block diagram illustrating the electrical structure of the digital signal processing circuit 14.

The digital image data that has been output from the analog/digital converting circuit 13 is input to the specific-target detecting circuit 15 upon being subjected to prescribed pre-processing in a pre-processor 31 of the digital signal processing circuit 14. The face image portion is detected in the specific-target detecting circuit 15 in the manner described above and the image data representing the face image is input to the CPU 3. Further, the data indicative of the area of the face in the preliminary image of the subject also is detected in the specific-target detecting circuit 15 and the data indicating this face area is applied to a gain correcting circuit 32, tone-curve correcting circuit 33 and color correcting circuit 34.

The image data representing the preliminary image of the subject is input to the gain correcting (linear tone correcting) circuit 32 and subjected to a gain correction.

Figure 4:
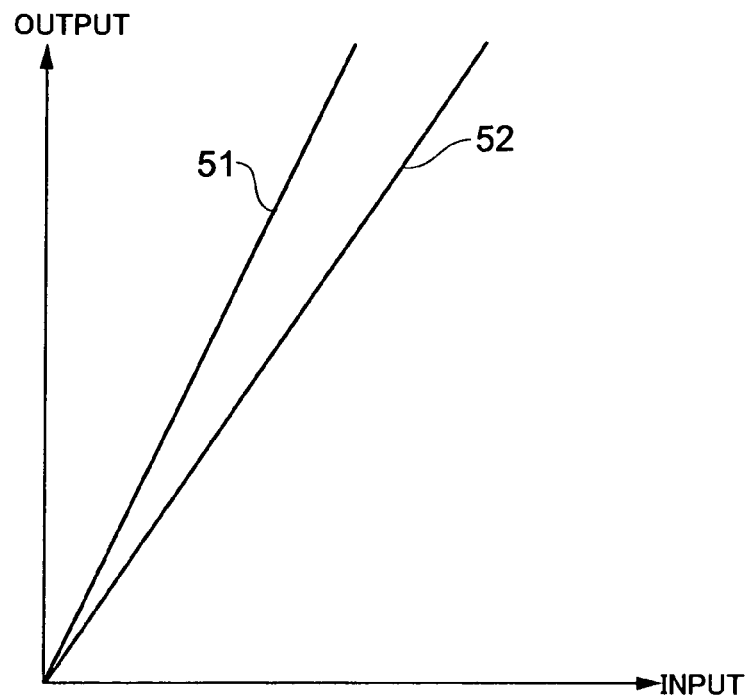
FIG. 4 is a graph illustrating the input/output characteristic of a gamma correcting circuit.

FIG. 4 illustrates an example of the input/output characteristic of the gain correcting circuit 32.

The gain correcting circuit 32 outputs the input digital image data while raising the level thereof uniformly and conforms to an input/output characteristic having linearity. Input/output characteristic 51 is used in a case where the brightness of a face image portion is made appropriate, as in the conventional manner. However, it can be understood that when a gain correction is performed using the input/output characteristic 51, blow-out may occur if the background is bright. An input/output characteristic 52 is used in this embodiment. Here the output level is lower than that of the conventional input/output characteristic 51. By performing a gain correction using the input/output characteristic 52, background blow-out will no longer occur while the brightness of the face image portion is maintained.

With reference again to FIG. 3, the image data that has been output from the gain correcting circuit 32 is input to the tone-curve correcting circuit 33 to be subjected to a tone-curve correction.

Figure 5:
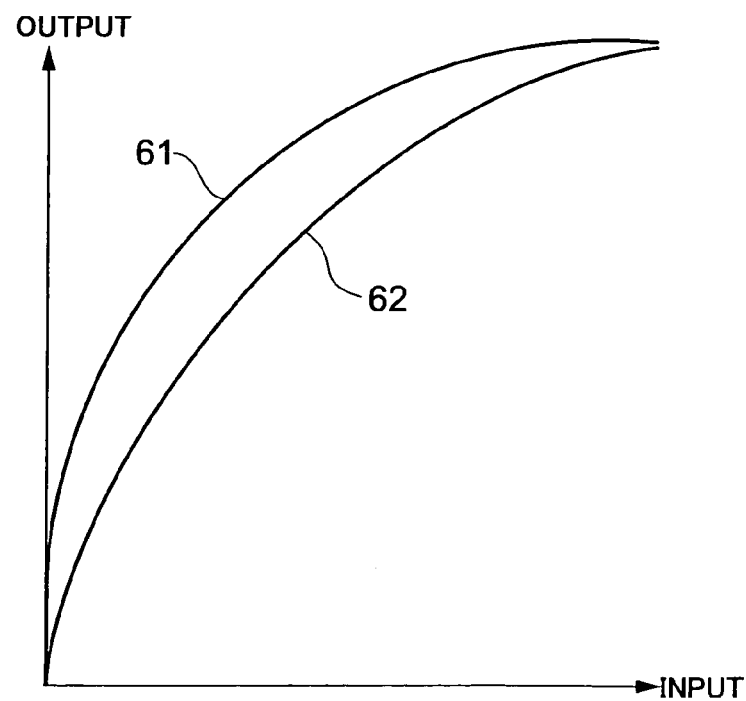
FIG. 5 is a graph illustrating the input/output characteristic of a tone-curve correcting circuit.

FIG. 5 is a graph illustrating the input/output characteristic of the tone-curve correcting circuit 33.

The tone-curve correcting circuit 33 outputs the input digital image data while raising the level thereof at a rate in accordance with the level and conforms to an input/output characteristic having non-linearity. The output level is high in the intermediate region of the input level and is comparatively low in the low or high region of the input level. Input/output characteristic 61 is used in a case where the brightness of a face image portion is made appropriate, as in the conventional manner. However, it can be understood that when a gain correction is performed using the input/output characteristic 61, continuity of tone may be lost in a dark portion and so-called tone blow-out may occur in the dark portion. An input/output characteristic 62 is used in this embodiment. Here the output level is lower than that of the conventional input/output characteristic 61. By performing a tone-curve correction using the input/output characteristic 62, the brightness of the face image portion can be maintained and blow-out in the background suppressed.

With reference again to FIG. 3, the image data that has been output from the tone-curve correcting circuit 33 is subjected to a color correction in the color correcting circuit 34. The image data output from the color correcting circuit 34 is output from the digital signal processing circuit 14 through a post-processor 35.

In the embodiment set forth above, both the gain correction and tone-curve correction are applied. However, it may be so arranged that either one of the corrections is applied.

Figure 6:
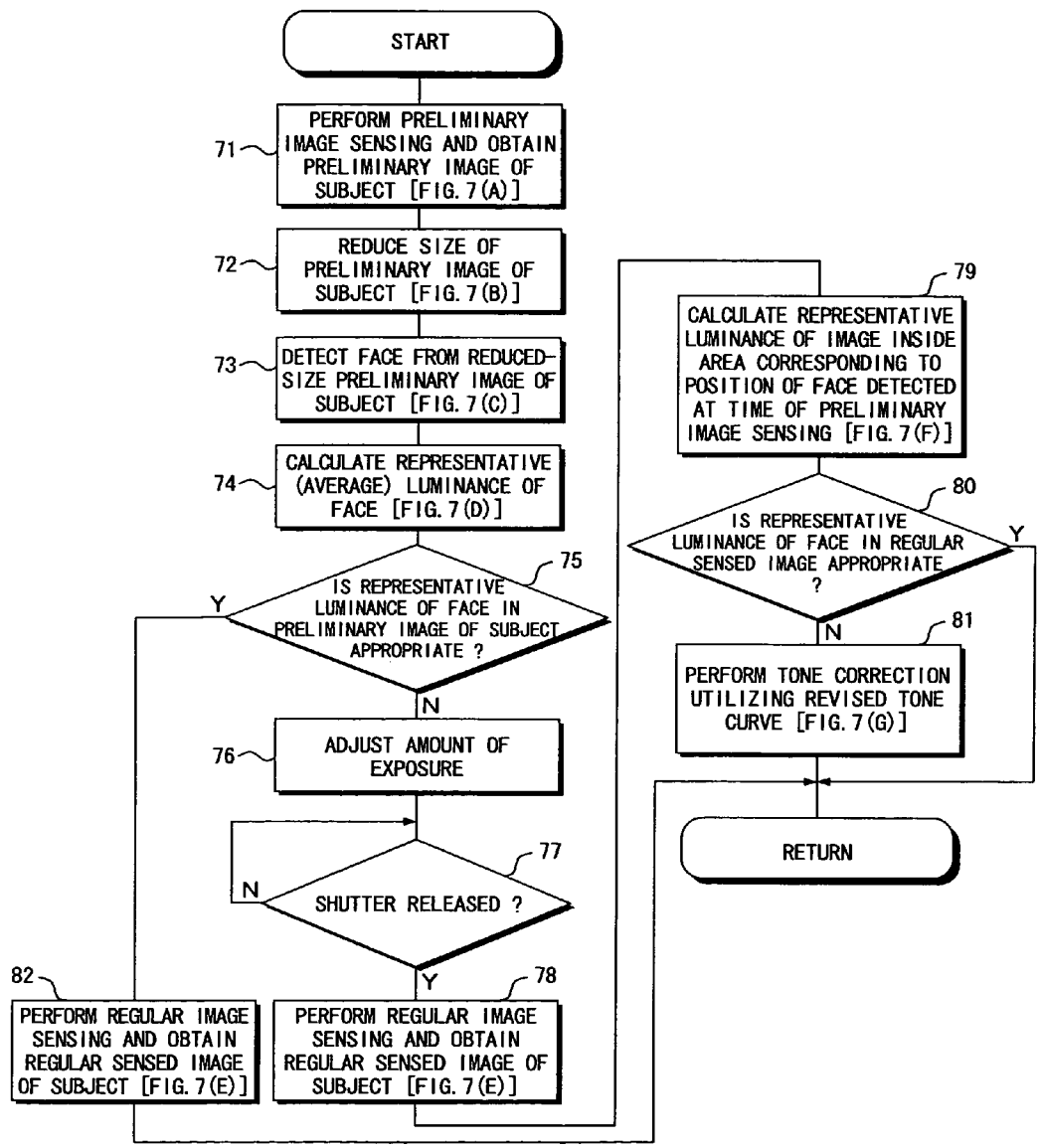
FIG. 6 is a flowchart illustrating processing executed by the digital still camera according to an embodiment of the present invention.

FIG. 6 is a flowchart illustrating processing executed by the digital still camera, and FIGS. 7(A) to (G) illustrate examples of images of a subject.

Figure 7A:
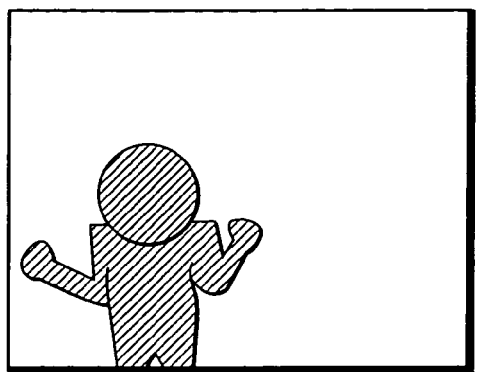
FIGS. 7(A) to (G) illustrate examples of images of a subject according to this embodiment.
Figure 7E:
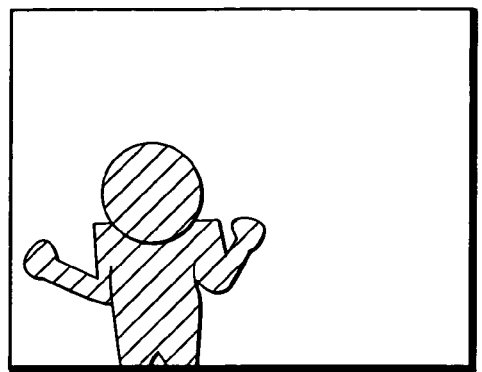
Figure 7B:
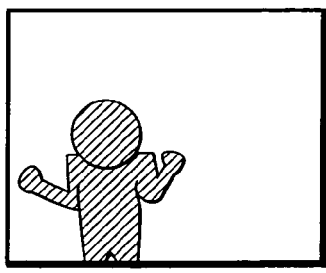
Figure 7F:
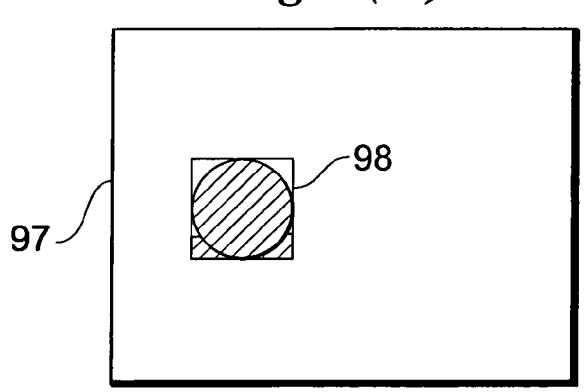
Figure 7C:
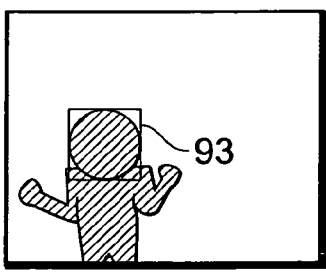
Figure 7D:
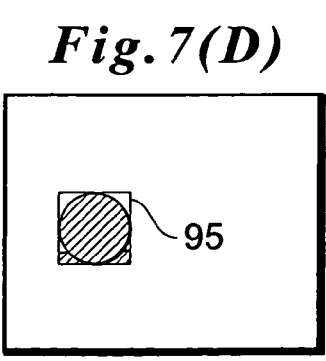
Figure 7G:
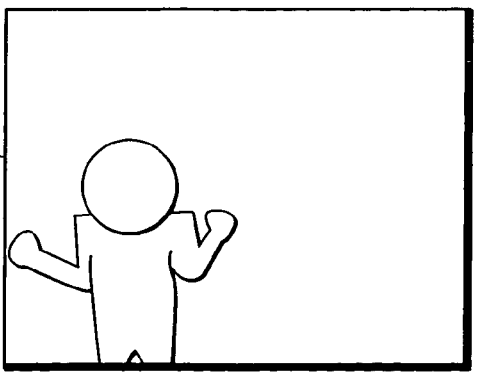

If the image sensing mode is set, preliminary image sensing is performed and a preliminary image 91 of the subject is obtained [step 71; FIG. 7(A)]. The specific-target detecting circuit 15 applies reduction processing to the preliminary image 91 of the subject obtained, whereby a reduced-size preliminary image 92 of the subject is obtained [step 72; FIG. 7(B)]. A face image portion 93 is detected from within the reduced-size preliminary image 92 [step 73; FIG. 7(C)]. The representative (average) luminance of a face image portion 95 is calculated in a preliminary image 94 of the subject [step 74; FIG. 7(D)]. It is determined whether the calculated representative luminance of a face image portion 95 is appropriate (i.e., whether the image of the face has the appropriate brightness (step 75). It is permissible to judge that the face image has the appropriate brightness even in a case where its brightness is slightly less than the appropriate brightness.

If the representative luminance does not have the appropriate brightness ("NO" at step 75), then the amount of exposure is adjusted by adjusting the f-stop and shutter speed in such a manner that the face image portion will take on a brightness that is slightly less than the appropriate brightness (step 76).

If the shutter-release button is pressed ("YES" at step 77), regular image sensing is performed and a regular sensed image 96 of the subject is obtained in the manner described above [step 78; FIG. 7(E)]. Since the amount of exposure has been adjusted, the regular sensed image 96 of the subject is slightly brighter than the preliminary image 91 of the subject, by way of example. In a regular sensed image 97 of the subject having an area 98 that corresponds to the area of the face image 93 (95) detected in the preliminary image of the subject, the representative luminance of the image within the area 98 is calculated in the regular sensed image 96 of the subject that has been obtained [step 79; FIG. 7(F)]. If the representative luminance obtained is still not appropriate ("NO" at step 80), then a tone correction is applied using the tone curve revised as described above (step 81). It goes without saying that a gain correction may be applied. Owing to the tone correction, there is obtained a regular sensed image 99 of the subject in which both the face portion and the background portion have brightnesses that are appropriate, comparatively speaking [FIG. 7(G)]. If the representative luminance of the face image portion in the regular sensed image of the subject is appropriate ("YES" at step 80), then the processing of step 81 is skipped.

Further, if the representative luminance of the face image portion in the preliminary image of the subject is appropriate ("YES" at step 75), then regular image sensing of the subject is performed and the regular sensed image of the subject is obtained without correcting the amount of exposure (step 82).

FIG. 8 is a flowchart illustrating processing executed by the digital still camera according to another embodiment of the present invention. Processing steps identical with those shown in FIG. 6 are designated by like step numbers.

This embodiment is such that if the representative luminance of a face image contained in a preliminary image of the subject obtained in preliminary image sensing is not appropriate ("NO" at step 75), then, following adjustment of the amount of exposure (step 76), whether a flash light-emission in regular image sensing is necessary or not is determined from the representative luminance of the detected face and the amount of exposure obtained by the exposure adjustment (step 101).

If the flash light-emission is deemed to be necessary ("NECESSARY" at step 101) and the shutter-release button is pressed ("YES" at step 102), then the flash is fired and regular image sensing is carried out in sync with the flash light-emission. As a result of regular image sensing, there is obtained a regular sensed image of the subject in which both the face image portion and the background portion have brightnesses that are appropriate, comparatively speaking (step 103).

If it is determined that a flash light-emission is not necessary ("UNNECESSARY" at step 101) and the shutter-release button is pressed ("YES" at step 104), regular image sensing is performed without firing the flash (step 105).

Figure 9:
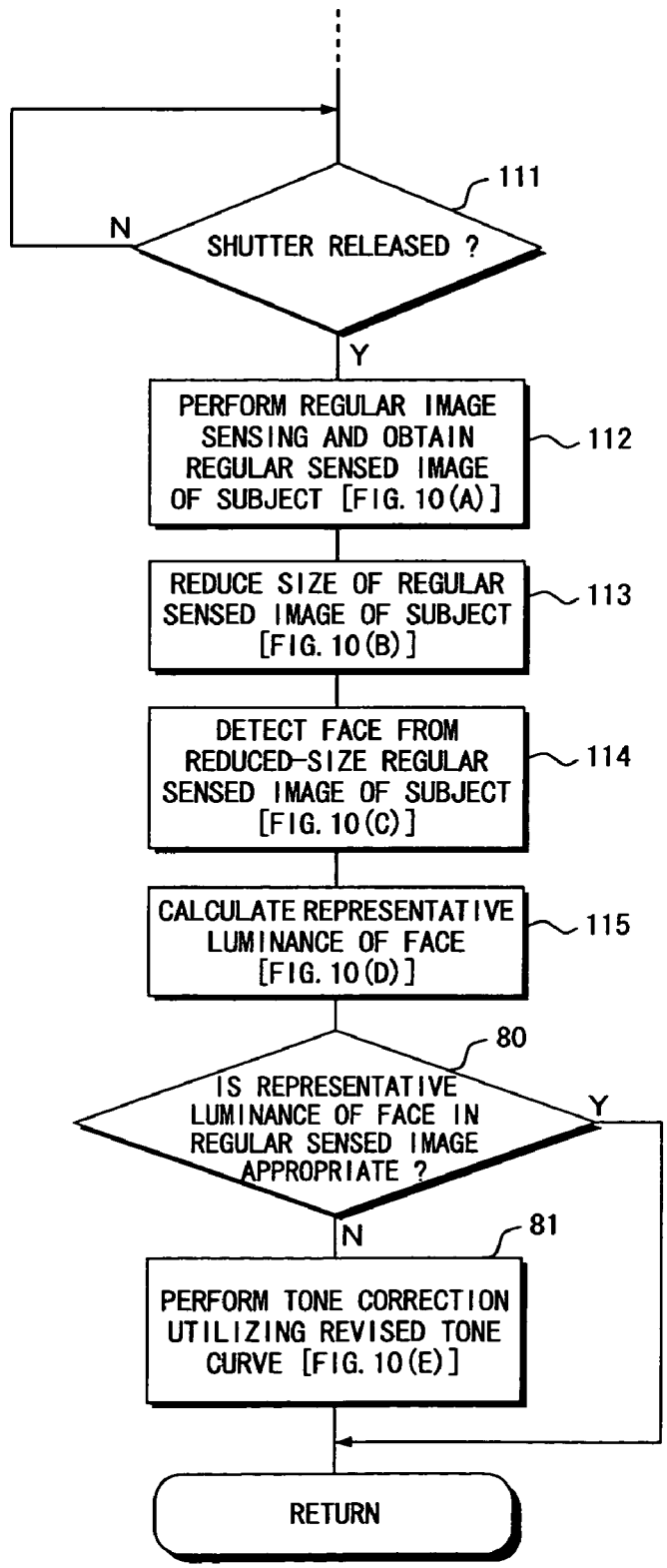
FIG. 9 is part of a flowchart illustrating processing executed by the digital still camera according to a further embodiment of the present invention.

FIGS. 9 and 10(A) to (E) illustrate a further embodiment of the present invention. FIG. 9 is part of a flowchart illustrating processing executed by the digital still camera. Processing steps identical with those shown in FIG. 6 are designated by like step numbers. FIGS. 10(A) to (E) illustrate examples of images of a subject according to this embodiment.

In the processing illustrated in FIG. 6, a face portion is not detected in regular image sensing. In FIG. 9, however, a face portion is detected from the regular sensed image of the subject.

Figure 10A:
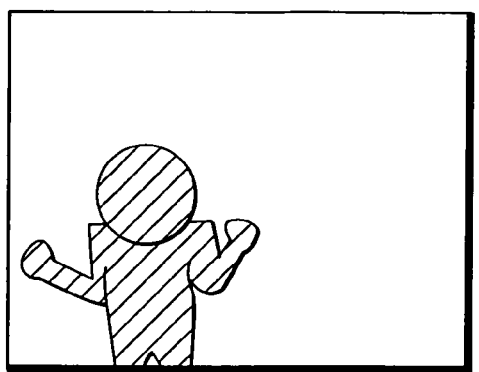
FIGS. 10(A) to (E) illustrate examples of images of a subject according to this embodiment.
Figure 10E:
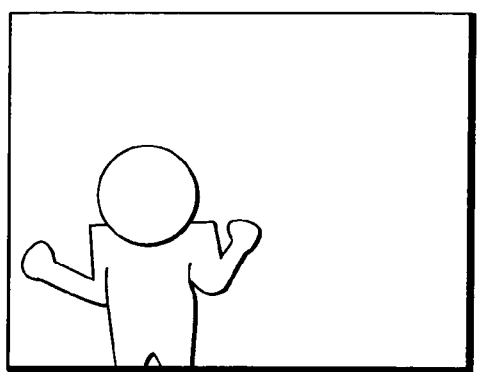
Figure 10B:
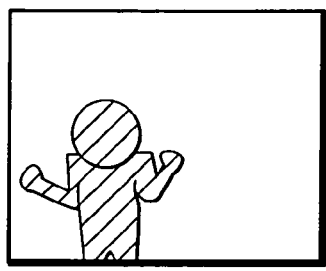

In the manner described above, preliminary image sensing is performed and, if the representative luminance of the image of a face detected in the preliminary image of the subject is not appropriate, the amount of exposure is adjusted. If the shutter-release button is pressed ("YES" at step 111), regular image sensing is performed and the regular sensed image 96 of the subject is obtained [step 112; FIG. 10(A)]. The obtained regular sensed image 96 of the subject is reduced in size and a reduced-size regular sensed image 111 of the subject is obtained [step 113; FIG. 10(B)].

Figure 10C:
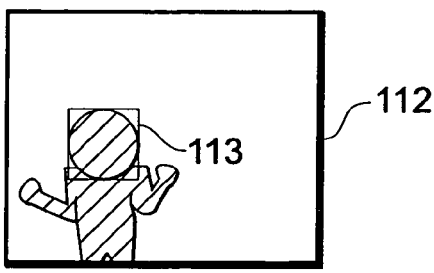
Figure 10D:
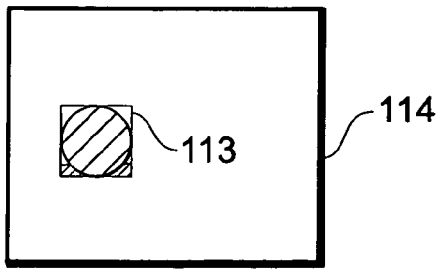

A face image portion 113 is detected from the reduced regular sensed image 111 of the subject, and a regular sensed image 112 of the subject in which the face image portion 113 has been detected is obtained [step 114; FIG. 10(C)]. The representative luminance of the face image portion 113 is calculated from an image 114 having the detected face image portion 113 [step 115; FIG. 10(D)]. If the calculated representative luminance is not appropriate ("NO" at step 80), then the tone correction is applied using the tone curve (step 81) and there is obtained a regular sensed image 115 of the subject in which both the face portion and the background portion have brightnesses that are appropriate comparatively speaking [FIG. 10(E)].

Since the face portion is detected from the image of the subject obtained by regular image sensing, the portion of the face in the image of the subject actually recorded is detected accurately and the brightness of the face portion takes on a brightness that is appropriate comparatively speaking.

Figure 11:
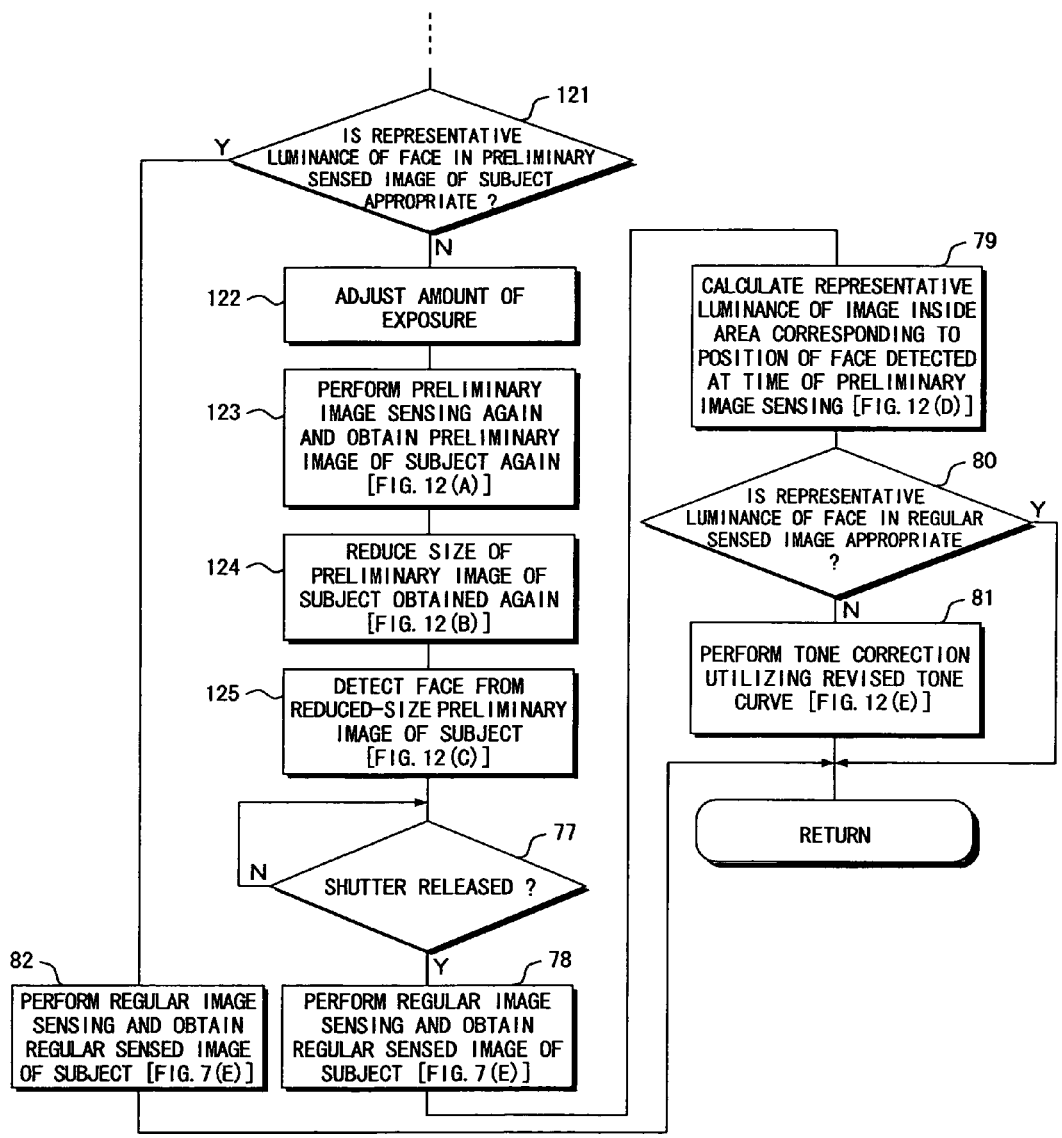
FIG. 11 is part of a flowchart illustrating processing executed by the digital still camera according to yet another embodiment of the present invention.

FIGS. 11 and 12(A) to (E) illustrate yet another embodiment of the present invention. FIG. 11 is part of a flowchart illustrating processing executed by the digital still camera. Processing steps identical with those shown in FIG. 6 are designated by like step numbers in FIG. 11 as well. FIGS. 12(A) to (E) illustrate examples of images of a subject according to this embodiment.

This embodiment performs preliminary image sensing, then performs preliminary image sensing again, reduces the image of the subject obtained, detects the face image portion from the reduced image of the subject and determines whether the representative luminance of the detected face image portion is appropriate or not. Since the image of reduced size is utilized, the face image portion can be detected comparatively quickly.

Figure 12A:
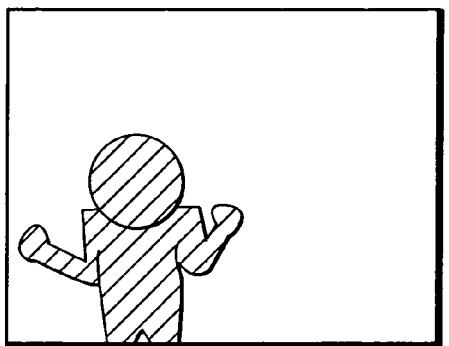
FIGS. 12(A) to (E) illustrate examples of images of a subject according to this embodiment.
Figure 12E:
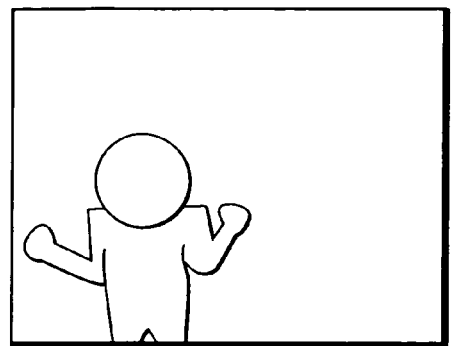
Figure 12B:
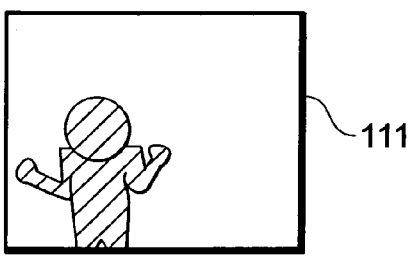
Figure 12C:
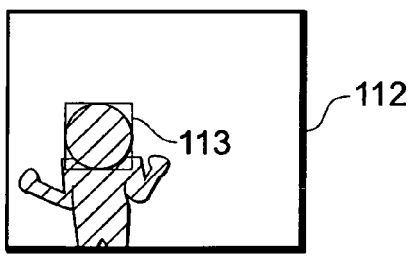
Figure 12D:
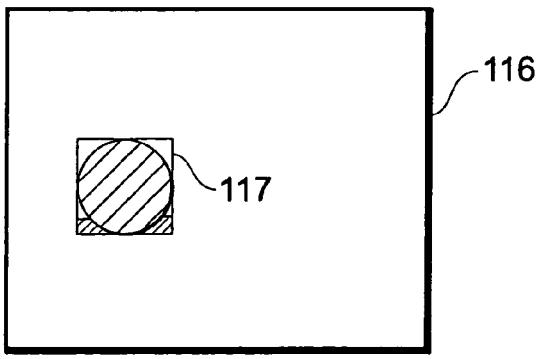

If the representative luminance of the face obtained by preliminary image sensing is not appropriate ("NO" at step 121), then the amount of exposure is adjusted, preliminary image sensing is performed again and a preliminary image 96 of the subject is attained again [steps 122, 123; FIG. 12(A)]. The preliminary image 96 of the subject obtained again is reduced and a reduced preliminary image 111 of the subject is obtained [step 124; FIG. 12(B)]. The face image portion 113 is detected from the reduced preliminary image 112 of the subject [step 125; FIG. 12(C)].

If the shutter-release button is pressed ("YES" at step 77), processing executed from this point onward is the same as that shown in FIG. 6. The face image portion 117 is detected from the image 116 of the subject obtained by regular image sensing (FIG. 12(D)) and an image 118 of the subject in which both the face image and background are comparatively bright (FIG. 12(F)) is obtained.

Figure 13:
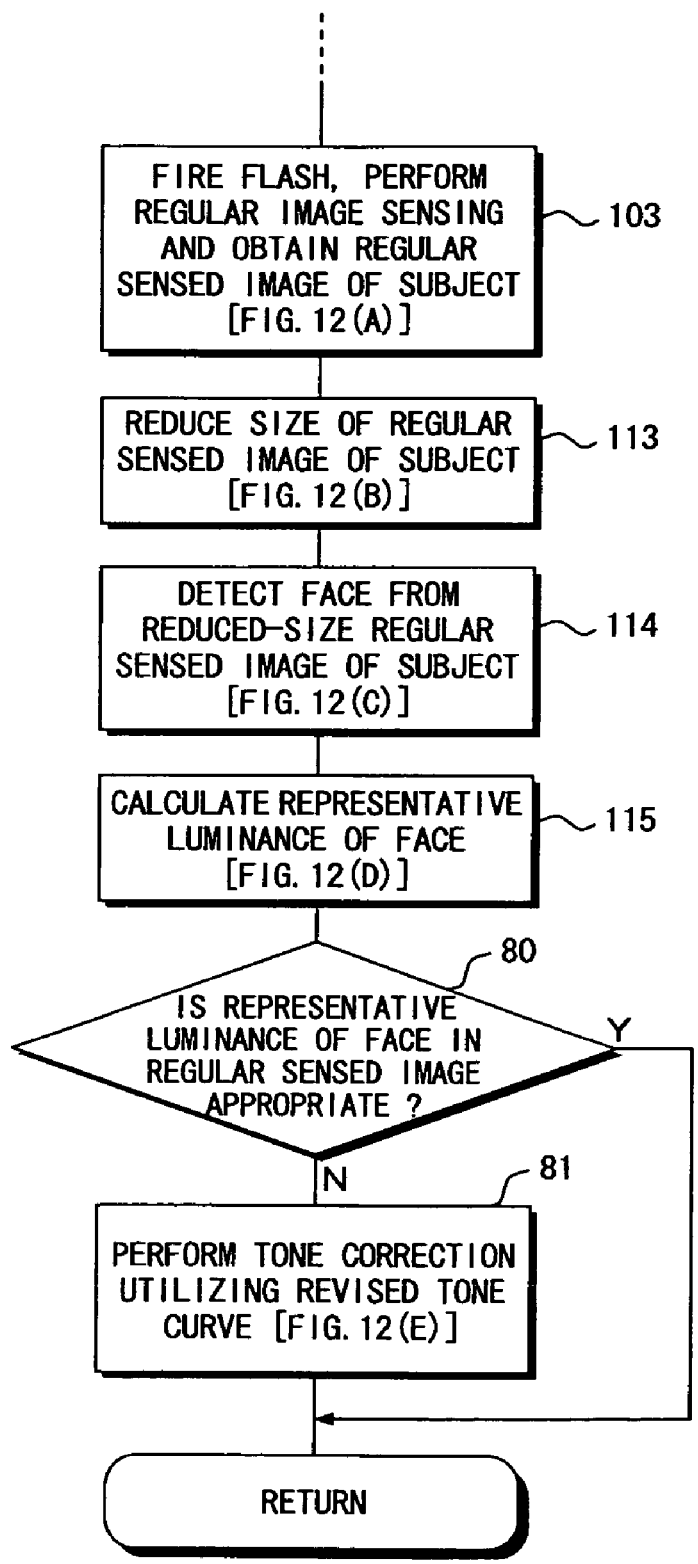
FIG. 13 is part of a flowchart illustrating processing executed by the digital still camera.

FIG. 13 is a part of a flowchart illustrating processing executed by the digital still camera according to yet another embodiment. Processing steps identical with those shown in FIGS. 6, 8 and 9 are designated by like step numbers in FIG. 13.

The processing illustrated in FIG. 13 follows step 103 shown in FIG. 8.

A regular sensed image of the subject is obtained by performing regular image sensing in sync with a flash light emission, as described above (step 103). Then, as illustrated in FIG. 9, the regular sensed image of the subject obtained is reduced and a tone correction is performed utilizing the tone curve in such a manner that the face image in the reduced regular sensed image of the subject will take on the appropriate brightness (steps 113 to 115; 80, 81).

Figure 14:
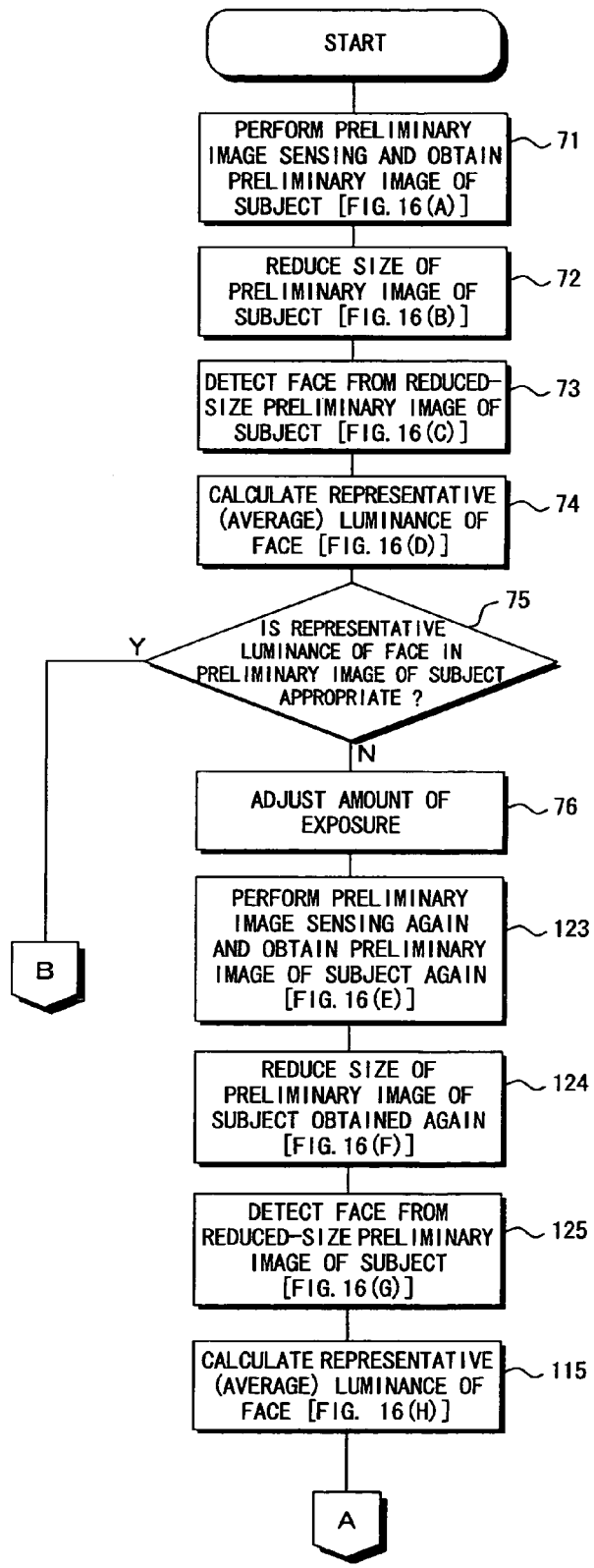
FIG. 14 is part of a flowchart illustrating processing executed by the digital still camera according to a further embodiment.
Figure 15:
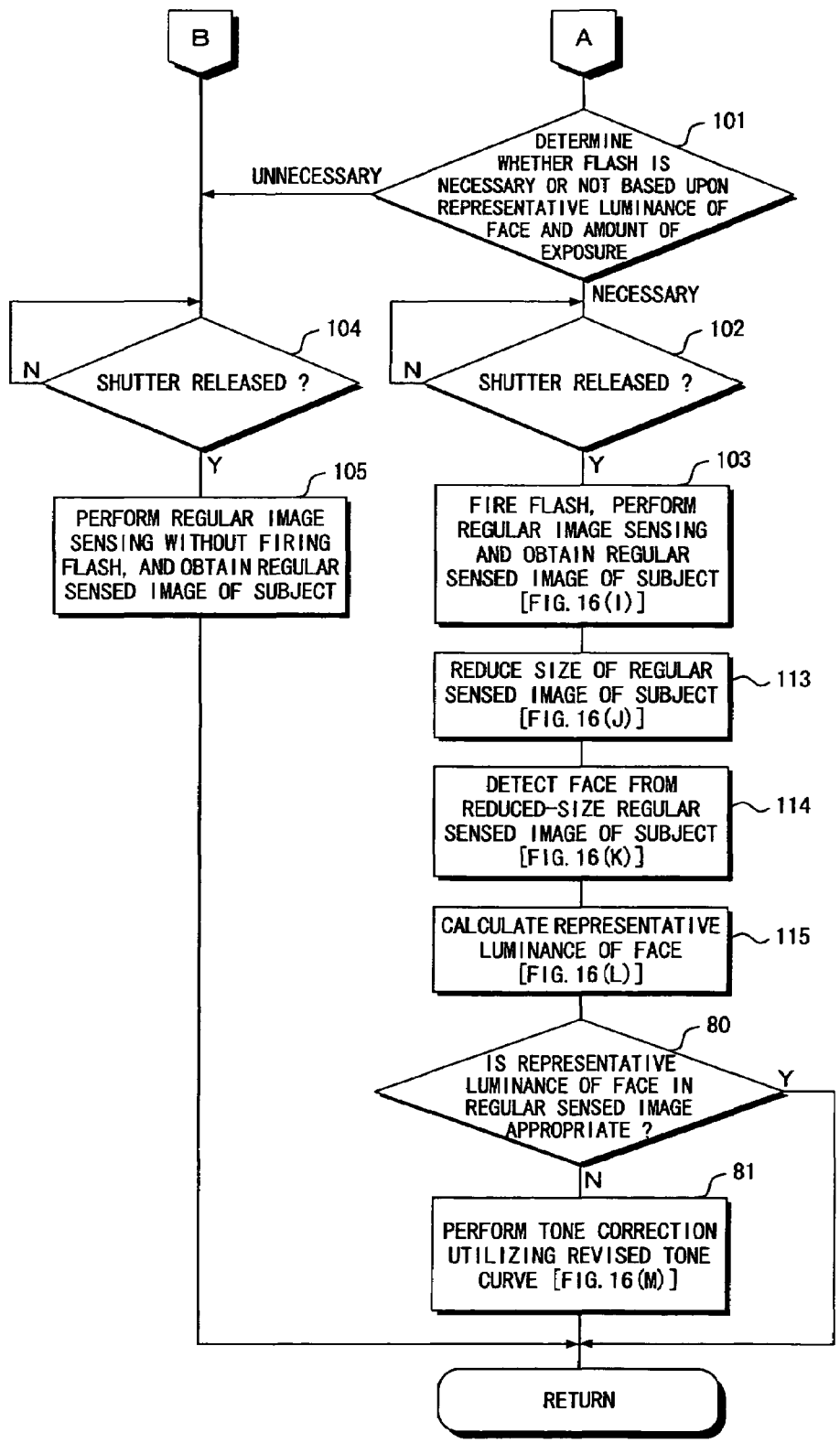
FIG. 15 is part of a flowchart illustrating processing executed by the digital still camera according to this embodiment.

FIGS. 14 to 16 illustrate a further embodiment of the present invention, in which FIGS. 14 and 15 are flowcharts illustrating processing executed by the digital still camera. Processing steps identical with those shown in FIGS. 6, 9 and 11 are designated by like step numbers and need not be described again. FIGS. 16(A) to (M) illustrate examples of images of a subject according to this embodiment.

Figure 16A:
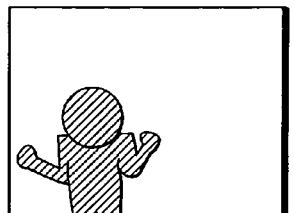
FIGS. 16(A) to (M) illustrate examples of images of a subject according to this embodiment.
Figure 16E:
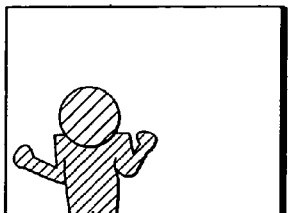
Figure 16I:
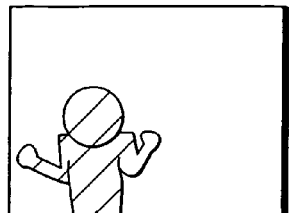
Figure 16B:
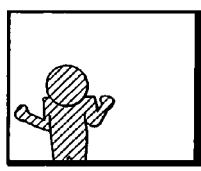
Figure 16F:
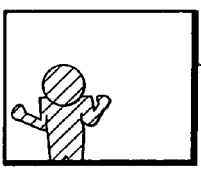
Figure 16J:
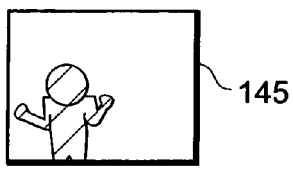
Figure 16C:
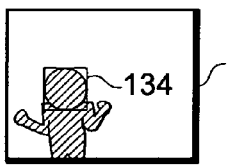
Figure 16G:
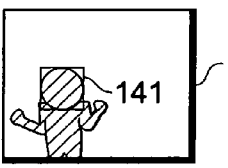
Figure 16K:
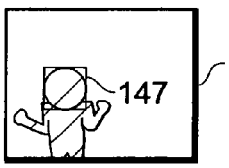
Figure 16D:
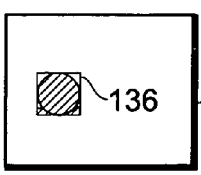

Preliminary image sensing is performed and a preliminary image 131 of the subject is obtained [step 71; FIG. 16(A)]. The preliminary image 131 of the subject is reduced and a reduced preliminary image 133 of the subject is obtained [step 72; FIG. 16(B)]. A face image portion 134 is detected from within the reduced-size preliminary image 132 [step 73; FIG. 16(C)]. Calculated from an image 135 having a face image portion 136 that has been detected is the representative luminance of the face image portion 136 [step 74; FIG. 16(D)].

Figure 16H:
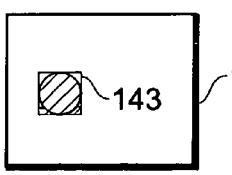

If the representative luminance of the face in preliminary image sensing does not have the appropriate brightness ("NO" at step 75), then the amount of exposure is adjusted (step 76), preliminary image sensing is performed again and a preliminary image 137 of the subject is obtained again [step 123; FIG. 16(E)]. The preliminary image of the subject that has been obtained again is reduced to obtain a reduced image 139 [step 124; FIG. 16(F)]. A face image portion 141 is detected from a reduced-size preliminary image 140 of the subject [step 125; FIG. 16(G)] and the representative luminance of a face image portion 143 is calculated from an image 142 that has this face image portion 143 [step 115; FIG. 16(H)].

Whether a flash light-emission is necessary or not is determined from the calculated representative luminance and amount of exposure obtained by the exposure adjustment (step 101). If the flash light emission is necessary ("NECESSARY" at step 101) and the shutter-release button is pressed ("YES" at step 102), then regular image sensing is performed in sync with the flash light-emission to obtain a regular sensed image 144 of the subject [step 103; FIG. 16(I)].

Figure 16L:
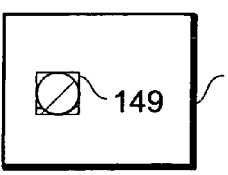
Figure 16M:
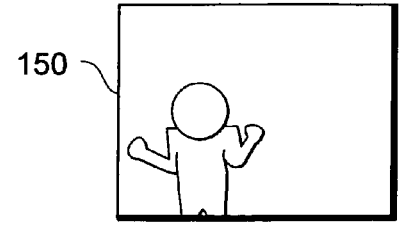

The obtained regular sensed image 144 of the subject is reduced in size and a reduced-size regular sensed image 145 of the subject is obtained [step 113; FIG. 16(J)]. A face image portion 147 is detected from the reduced-size regular sensed image 146 of the subject [step 114; FIG. 16(K)]. Calculated from an image 148 that has the detected face image portion 149 is the representative luminance of the face image portion 149 [step 115; FIG. 16(L)].

If the calculated representative luminance is not appropriate ("NO" at step 80), then the tone correction utilizing the tone curve is applied to the regular sensed image of the subject (step 81). As a result, there is obtained an image 150 of the subject in which both the face portion and the background have brightnesses that are appropriate, comparatively speaking [FIG. 16(M)].

If the representative luminance of the face portion in preliminary image sensing is appropriate ("YES" at step 75), or if it is determined that the flash light emission is unnecessary ("UNNECESSARY" at step 101), and the shutter-release button is pressed ("YES" at step 104), then regular image sensing is performed without firing the flash (step 105).

As many apparently widely different embodiments of the present invention can be made without departing from the spirit and scope thereof, it is to be understood that the invention is not limited to the specific embodiments thereof except as defined in the appended claims.

What is claimed is:

1. An image sensing system comprising:
   an image sensing device for sensing the image of a subject and outputting image data representing the image of the subject;

a preliminary-image-sensing control device for controlling said image sensing device so as to perform preliminary image sensing and output image data representing a preliminary image of the subject;

a first target-image detecting device for detecting a target image from within the preliminary image of the subject represented by the image data that has been output from said image sensing device under the control of said preliminary-image-sensing control device;

an exposure-amount adjustment determination device for determining whether adjustment of amount of exposure is necessary based upon the target image that has been detected by said first target-image detecting device;

a first regular-image-sensing control device for controlling said image sensing device so as to perform regular image sensing and output image data, which represents a regular sensed image of the subject, in response to a determination by said exposure-amount adjustment determination device that adjustment of amount of exposure is unnecessary;

an exposure-amount adjusting device for adjusting amount of exposure, in response to a determination by said exposure-amount adjustment determination device that adjustment of amount of exposure is necessary, in such a manner that the amount of exposure of the target image detected by said first target-image detecting device will result in a brightness in the vicinity of an appropriate brightness;

a second regular-image-sensing control device for controlling said image sensing device so as to perform regular image sensing and output image data, which represents a regular sensed image of the subject, based upon the amount of exposure obtained by the adjustment performed by said exposure-amount adjusting device;

a flash light-emission determination device for determining whether a flash light-emission is necessary based upon an image in an area corresponding to the target image detected by said first target-image detecting device and the amount of exposure obtained by the adjustment performed by said exposure-amount adjusting device in the preliminary sensed image of the subject represented by the image data that is output from said image sensing device under the control of said preliminary-image-sensing control device;

a flash light-emission control device, responsive to a determination by said flash light-emission determination device that a flash light-emission is necessary, for controlling a flash light-emission unit in such a manner that a flash light-emission is performed in sync with regular image sensing by said second regular-image-sensing control device;

a second target-image detecting device for detecting the target image from within the regular sensed image of the subject represented by the image data that is output from said image sensing device based upon control by said second regular-image-sensing control device;

a tone-correction determination device for determining whether a tone correction is necessary based upon the target image that has been detected by said second target-image detecting device; and a tone correcting device, responsive to a determination by said tone-correction determination device that a tone correction is necessary, for subjecting the image data, which is output from said image sensing device under the control of said second regular-image-sensing control device, to a tone correction in such a manner that the target image detected by said second target-image detecting device will take on the appropriate brightness.

2. An image sensing system comprising:

an image sensing device for sensing the image of a subject and outputting image data representing the image of the subject;

a preliminary-image-sensing control device for controlling said image sensing device so as to perform preliminary image sensing and output image data representing a preliminary image of the subject;

a first target-image detecting device for detecting a target image from within the preliminary image of the subject represented by the image data that has been output from said image sensing device under the control of said preliminary-image-sensing control device;

an exposure-amount adjustment determination device for determining whether adjustment of amount of exposure is necessary based upon the target image that has been detected by said first target-image detecting device;

a first regular-image-sensing control device for controlling said image sensing device so as to perform regular image sensing and output image data, which represents a regular sensed image of the subject, in response to a determination by said exposure-amount adjustment determination device that adjustment of amount of exposure is unnecessary;

an exposure-amount adjusting device for adjusting amount of exposure, in response to a determination by said exposure-amount adjustment determination device that adjustment of amount of exposure is necessary, in such a manner that the amount of exposure of the target image detected by said first target-image detecting device will result in a brightness in the vicinity of an appropriate brightness;

a second regular-image-sensing control device for controlling said image sensing device so as to perform regular image sensing and output image data, which represents a regular sensed image of the subject, based upon the amount of exposure obtained by the adjustment performed by said exposure-amount adjusting device;

a second target-image detecting device for detecting the target image from within the regular sensed image of the subject represented by the image data that is output from said image sensing device under the control of said second regular-image-sensing control device;

a tone-correction determination device for determining whether a tone correction of the target image detected by said second target-image detecting device is necessary; and a tone correcting device, responsive to a determination by said tone-correction determination device that a tone correction is necessary, for subjecting the image data, which is output from said image sensing device under the control of said second regular-image-sensing control device, to a tone correction smaller than a tone correction that brings the target image detected by said first target-image detecting device to an appropriate brightness in a case where adjustment of amount of exposure by said exposure-amount adjusting device is not carried out.

3. The system according to claim 1 or 2, further comprising a reduced-image generating device for generating a reduced image of the regular sensed image of the subject represented by the image data that is output from said image sensing device based upon control by said second regular-image-sensing control device;

wherein said second target-image detecting device detects the target image from within the reduced image generated by said reduced-image generating device.

* * * * *